United States Patent
Bryman

(10) Patent No.: US 7,531,791 B2
(45) Date of Patent: May 12, 2009

(54) GEOLOGICAL TOMOGRAPHY USING COSMIC RAYS

(75) Inventor: Douglas Bryman, Vancouver (CA)

(73) Assignee: Advanced Applied Physics Solutions, Inc., British Columbia (CA)

( * ) Notice: Subject to any disclaimer, the term of this patent is extended or adjusted under 35 U.S.C. 154(b) by 0 days.

(21) Appl. No.: 11/984,480

(22) Filed: Nov. 19, 2007

(65) Prior Publication Data

US 2008/0128604 A1  Jun. 5, 2008

Related U.S. Application Data

(63) Continuation-in-part of application No. 11/356,244, filed on Feb. 17, 2006.

(60) Provisional application No. 60/653,527, filed on Feb. 17, 2005.

(51) Int. Cl.
*G01V 5/04* (2006.01)

(52) U.S. Cl. .................................................. 250/266

(58) Field of Classification Search ................. 250/266
See application file for complete search history.

(56) References Cited

U.S. PATENT DOCUMENTS

| | | | |
|---|---|---|---|
| 4,504,438 A | 3/1985 | Levy et al. | |
| 4,670,656 A * | 6/1987 | Bolon | 250/385.1 |
| 5,042,611 A | 8/1991 | Howlett | |
| 5,481,501 A | 1/1996 | Blakeslee et al. | |
| 5,886,255 A | 3/1999 | Aronstam | |
| 6,566,657 B2 * | 5/2003 | Odom et al. | 250/390.11 |
| 6,639,210 B2 * | 10/2003 | Odom et al. | 250/269.6 |
| 6,894,949 B2 | 5/2005 | Aronstam | |
| 6,944,548 B2 | 9/2005 | Radtke et al. | |
| 6,997,257 B2 | 2/2006 | Snoga | |
| 7,046,581 B2 | 5/2006 | Calvert | |
| 2003/0062158 A1 | 4/2003 | Spross | |
| 2003/0103067 A1 | 6/2003 | Trell | |
| 2004/0163443 A1 | 8/2004 | McElhinney | |
| 2005/0189483 A1 | 9/2005 | Sale | |
| 2005/0205798 A1 * | 9/2005 | Downing et al. | 250/390.11 |
| 2006/0096105 A1 | 5/2006 | Haugland | |

FOREIGN PATENT DOCUMENTS

| | | |
|---|---|---|
| JP | 6-284329 | 10/1994 |
| WO | WO 2007/107765 | 9/2007 |

OTHER PUBLICATIONS

W. Blum and L. Rolandi, *Particle Detection with Drift Chambers*, Springer, 1994, pp. 304-319.

(Continued)

*Primary Examiner*—David P Porta
*Assistant Examiner*—Djura Malevic
(74) *Attorney, Agent, or Firm*—Harness, Dickey & Pierce, P.L.C.

(57) ABSTRACT

Disclosed are a system and method configured for detecting cosmic ray muon (CRM) flux along a variety of trajectories through a subterranean test region, collecting the muon detection data, and processing the data to form a three-dimensional density distribution image corresponding to the test region. In at least one embodiment, the system may be used for identifying concentrations of higher (or lower) density mineral deposits or other geological structures or formations well below the earth's (or ocean floor) surface. The system may be utilized for imaging geological materials and structures of higher and/or lower density in a test region having a depth of several kilometers or more.

20 Claims, 6 Drawing Sheets

OTHER PUBLICATIONS

C. Grupen, *Particle Detectors*, Cambridge University Press, 1996, pp. 117-121 and 359-365.

F. Sauli and A. Sharma, *Micropattern Gaseous Detectors*, Annu. Rev. Nucl. Part. Sci., vol. 49, 1999, pp. 341-388.

R. K. Adair and H. Kasha, *Cosmic-Ray Muons*, Academic Press, 1976, pp. 323-385.

L. W. Alvarez, et al., *Search for Hidden Chambers in the Pyramids*, Science, New Series, vol. 167, No. 3919, 1970, pp. 832-839.

C.K. Hargrove, et al., *Spatial Resolution of TPC*, Nuclear Instruments and Methods in Physics Research, vol. 219, 1984, pp. 461-471.

K. Klingenbeck-Regn, et al., *Subsecond multi-slice computed tomography: basics and applications*, European Journal of Radiology, vol. 31, 1999, pp. 110-124.

K. Nagamine, et al., *Method of probing inner-structure of geophysical substance with the horizontal cosmic-ray muons and possible application to volcanic eruption prediction*, Nuclear Instruments and Methods in Physics Research A, vol. 356, 1995, pp. 585-595.

Particle Data Group, *Review of Particle Physics*, Physics Letters B, vol. 592, 2004, pp. 1-5.

H. Tanaka, et al., *Development of a two-fold segmented detection system for near horizontally cosmic-ray muons to probe the internal structure of a volcano*, Nuclear Instruments and Methods in Physics Research A, vol. 507, 2003, pp. 657-669.

ISR and Written Opinion mailed Aug. 7, 2007.

*Muon Tomography Used to Study Underground Rock Structure*, Alekseyev, A., Transl. into English from NTR: Probl. i Resheniya (Moscow), Apr. 30-May 13, 1985, p. 6. (Abstract).

*Geological Applications of Cosmic Rays*, Zhdanov, G. B., In: Space and development; Proceed. of the Vikram Sarabhai Symp., Bangalore, India, May 29-Jun. 9, 1979. Symp. sponsored by Cospar, UN, and Committee on Science and Tech. for Developing Countries. Oxford and Elmsford, N.Y., Pergamon Press (Advances in Space Explor. vol. 6), 1980, p. 35-47. (Abstract).

*Feasibility of Cosmic-Ray Muon Intensity Measurements for Tunnel Detection*, Celmins, Aivars, 1990-06. (Abstract).

*In Situ Cosmogenic Isotopes in Geological Applications*, Journal of the Korean Physical Society, vol. 39, No. 4, Publication Date Oct. 1, 2001, pp. 783-789. (Abstract).

*Introduction to Geo-Tomography*, Chigaku Zasshi (Journal of Geography), vol. 104, No. 7, Publication Date Dec. 25, 1995, pp. 913-921. (Abstract).

*Exploration of the Earth by Means of Neutrino Oscillations*, Kinki Daigaku Rikogakubu Kenkyu Hokoku (Japan), Abbreviated Journal Title Kinki Daigaku Rikogakuku Kenkyu Hokoku, No. 25, Publication Date Sep. 1989, pp. 53-58. (Abstract).

*Cosmogenic Nuclides, Remote Sensing, and Field Studies Applied to Desert Piedmonts* (Arizona), Robinson, Sarah Elizabeth et al., vol. 63-05B, Publication Date 2002, pp. 2261 387. (Abstract).

*Surface Exposure Geochronology Using Cosmogenic Nuclides*: Applications In Antarctic Glacial Geology, Brook, Edward Jeremy et al., vol. 55-05B, Publication Date 1994, pp. 1773. (Abstract).

*Neutrino Geophysics—A Future Possibility*, Fiz. Sz., vol. 38, No. 4, Publication Date Apr. 1988, pp. 126-130. (Abstract).

*On The Muon Method in Neutrino Geophysics*. Collection, Saleev et al., Publication Date 1985, pp. 49-52. (Abstract).

*Applicability of Neutrino Beams to Earth Exploration*, Vestn. Akad. Nauk SSSR, No. 6, Publication Date 1985, pp. 73-84. (Abstract).

*Method and Apparatus for Determining the Density Characteristics of Underground Earth Formations*, Levy, R. H.; Mockett, P. M., Publication Date Mar. 12, 1985, Patent No. 4,504,438, Date Filed Dec. 7, 1981. (Abstract).

*Density Differentiation of Rock Massif by Muon Method*, Abilov, M. Zh. M., Publication Date 1983, pp. 7. (Abstract).

*New Techniques for Engineering Geophysics*, Bondarenko, V. M. et al., Publication Date 1983, pp. 224. (Abstract).

*Borehole Facility for Determining Soil Density by Underground Detection of Cosmic Muons*, Abduzhukurov, D. A. et al., No. 3, Publication Date 1982, pp. 28-32. (Abstract).

*Neurtino Exploration of the Earth*, Rujula, A. de, vol. 99, No. 6, Publication Date Oct. 1983, pp. 341-396. (Abstract).

*New Methods of Engineering Geophysics*, Bondarenko, V.M. et al., Publication Date 1983, pp. 224. (Abstract).

*Possibilities of Using a Muon Hodoscope in Searching for Ores in Minings*, Bobodzhanov, I. B. et al., vol. 42, No. 7, Publication Date Jul. 1978, pp. 1494-1496. (Abstract).

* cited by examiner

GEOLOGICAL TOMOGRAPHY USING COSMIC RAYS

PRIORITY STATEMENT

This application is a continuation-in-part of and claims priority under 35 U.S.C. § 120 on U.S. application Ser. No. 11/356,244, filed Feb. 17, 2006, which claims priority under 35 U.S.C. § 119(e) on U.S. Provisional Application No. 60/653,527, filed on Feb. 17, 2005 in the United States Patent and Trademark Office, the entire contents of each of which are hereby incorporated herein by reference.

TECHNICAL FIELD

The present disclosure generally relates to the identification, measurement, and imaging of geological structures through the detection and analysis of high energy cosmic ray muons ("CRM").

BACKGROUND

High energy CRM produced in the atmosphere impinge on the earth's surface and penetrate deep below the surface. The flux and angular distribution of these particles at the surface is well known and their flux and angular distributions at various depths below the surface has been studied for standard geological situations. The penetration depth into the earth of any single particle of given energy at the surface will depend on the amount and composition of the material it encounters along its trajectory.

Measurements of the flux of CRM along well defined directions near the earth's surface have been employed to uncover evidence of undiscovered cavities in pyramids, L. W. Alvarez et al., Science 167 (1970) 832 ("Alvarez"), and low density regions in volcanoes, K. Nagamine et al., NIM A356 (1995) 358 ("Nagamine") and H. Tanaka, et al., NIM A507 (2003) 657 ("Tanaka"), the disclosures of which are hereby incorporated herein, in their entirety, by reference. Because the intensity of CRMs along a particular direction between a massive object and a detector is directly related to the total amount and composition of the material (X) through which the CRM has passed before reaching the detector, by observing the CRMs passing through the same object at one or more angles, a density image of the object such as a volcano may be formed.

The techniques described by Alvarez, Nagamine, and Tanaka are similar in some respects to those employed in medical and industrial imaging such as computed tomography (CT), as described in, for example, in K. Klingenbeck-Regn et al., "Subsecond multi-slice computed tomography: basics and applications," Eur. J. Radiol. 31 (1999), 110-124 ("Klingenbeck-Regn"), the disclosure of which is hereby incorporated herein, in its entirety, by reference. These techniques use the differential absorption of particles (x-rays in the case of CT) along various lines of sight are used to construct image "slices" reflecting variations within the internal structure of the patient or object under study.

The measurement techniques utilized by Alvarez, Nagamine, and Tanaka employed position and angle measuring CRM detector systems positioned near the surface of the earth to obtain crude images of objects above the detectors for the detection of low density regions within the objects, e.g., pyramids and volcanoes, under study. The distributions of CRM which penetrated the object as determined by the intensities $n(\theta)$ at various and angles ($\theta$), were analyzed to produce crude density image projections since there is a unique relationship between $n(\theta)$ and the amount of material $X(\theta)$ along the direction measured.

Thus, regions of lower density could be revealed by measuring $n(\theta)$ for a given angle $\theta$ to determine $X(\theta)$. In the cases described by Nagamine and Tanaka, nearly horizontal CRM passing through the volcano were compared to those passing through the atmosphere to locate regions of low density in a known direction. In the case described by Alvarez, nearly vertical CRM were used to survey the structure of the pyramid above the detectors.

SUMMARY

Disclosed are a system for and a method of using CRM for constructing and imaging a three-dimensional density distribution of material within the earth. These systems and methods may be used for identifying concentrations of higher (or lower) density mineral deposits or other geological structures or formations well below the earth's (or ocean floor) surface. These systems and methods may be utilized for imaging geological materials having a depth of several kilometers. The systems and methods may be utilized for identifying deposits or structures exhibiting higher and/or lower density compared to surrounding bulk material.

A system for mapping subterranean densities according to the present disclosure may include a plurality of muon detectors in one or more subterranean locations; a drift region in at least one of the plurality of muon detectors; a voltage plane in the drift region; and/or a 2-dimensional measuring device at an end of the drift region to measure a plurality of muon trajectories.

An example embodiment of a system according to the present disclosure may also include a plurality of muon detectors configured for deployment in subterranean test locations, e.g., mines, wells, boreholes and caverns, for detecting muon flux data associated with a subterranean test region; at least one positioning device for determining the location of the test locations at which the muon detectors are deployed, a communication device connected to the muon detectors for receiving and transmitting the detected muon flux data, e.g., a conductive or fiber optic communication cable or an RF transmitter, a processor configured for receiving the detected muon flux data and manipulating the detected muon flux data to produce a three-dimensional density map corresponding of the subterranean test region.

A method for mapping subterranean densities according to the present disclosure may include positioning a plurality of muon detectors in one or more subterranean locations, at least one of the plurality of muon detectors having a drift region; providing a voltage plane in the drift region; generating an electric field with the voltage plane, the electric field being parallel to a longitudinal axis of the drift region; and/or measuring a plurality of muon trajectories.

A method according to an example embodiment of the present disclosure may also include positioning and, in some instances, repositioning, a plurality of muon detectors at a plurality of subterranean locations adjacent the test region, collecting muon detection data from the detectors for a plurality of intersecting trajectories, and processing the collected muon detection data to form a three-dimensional density map of the test region.

BRIEF DESCRIPTION OF THE DRAWINGS

The systems and methods of the present disclosure may become more apparent in view of descriptions of example embodiments herein with reference to the accompanying drawings in which.

Figure 1:
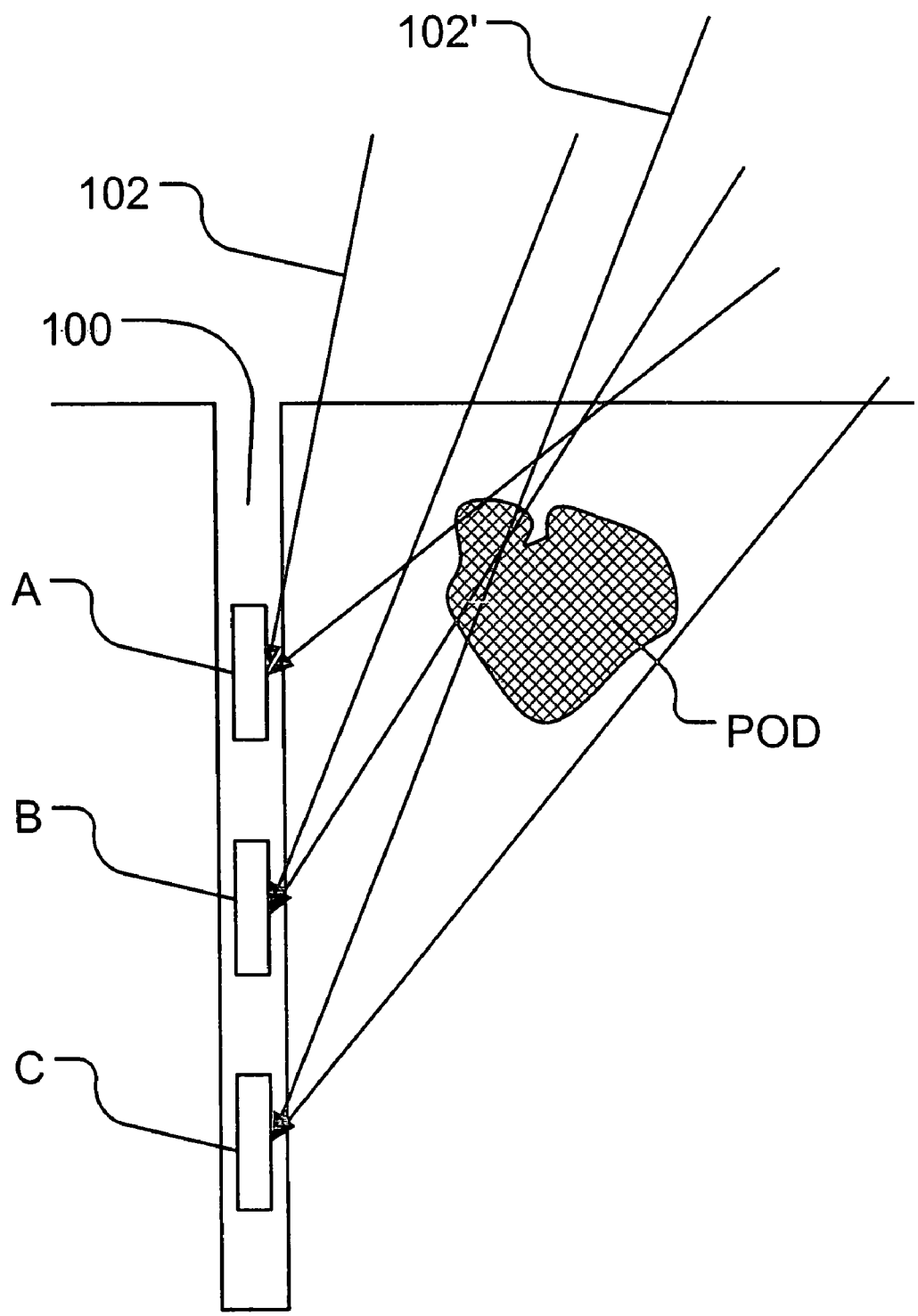
FIG. 1 illustrates cosmic ray muons (CRM) impinging on the surface of the earth penetrating to various depths depending on their energy and the amount of material encountered along their paths resulting in a reduction in the flux of CRM reaching a group of vertically arrayed detectors A, B, and C along trajectories 102' that extend through a higher density region, POD, and trajectories 102 which do not intersect the POD.

These drawings have been provided to assist in the understanding of the example embodiments of the present disclosure as described in more detail below and should not be construed as unduly limiting the present disclosure. In particular, the relative spacing, positioning, sizing, and dimensions of the various elements illustrated in the drawings may not have been drawn to scale and may have been exaggerated, reduced, or otherwise modified for the purpose of improved clarity. Those of ordinary skill in the art will also appreciate that a range of alternative configurations are available, although they have been omitted herein for purposes of brevity and clarity.

DETAILED DESCRIPTION

Example embodiments of the present disclosure include a system for and a method of using CRM for constructing and imaging a three-dimensional density distribution of material within the earth. This technique may be used for exploration and location of higher (or lower) density mineral deposits or structures below the earth's (or ocean floor) surface. This technique may be utilized at depths of up to several kilometers for detecting and locating deposits or structures having either higher or lower density when compared to surrounding material.

Figure 2:
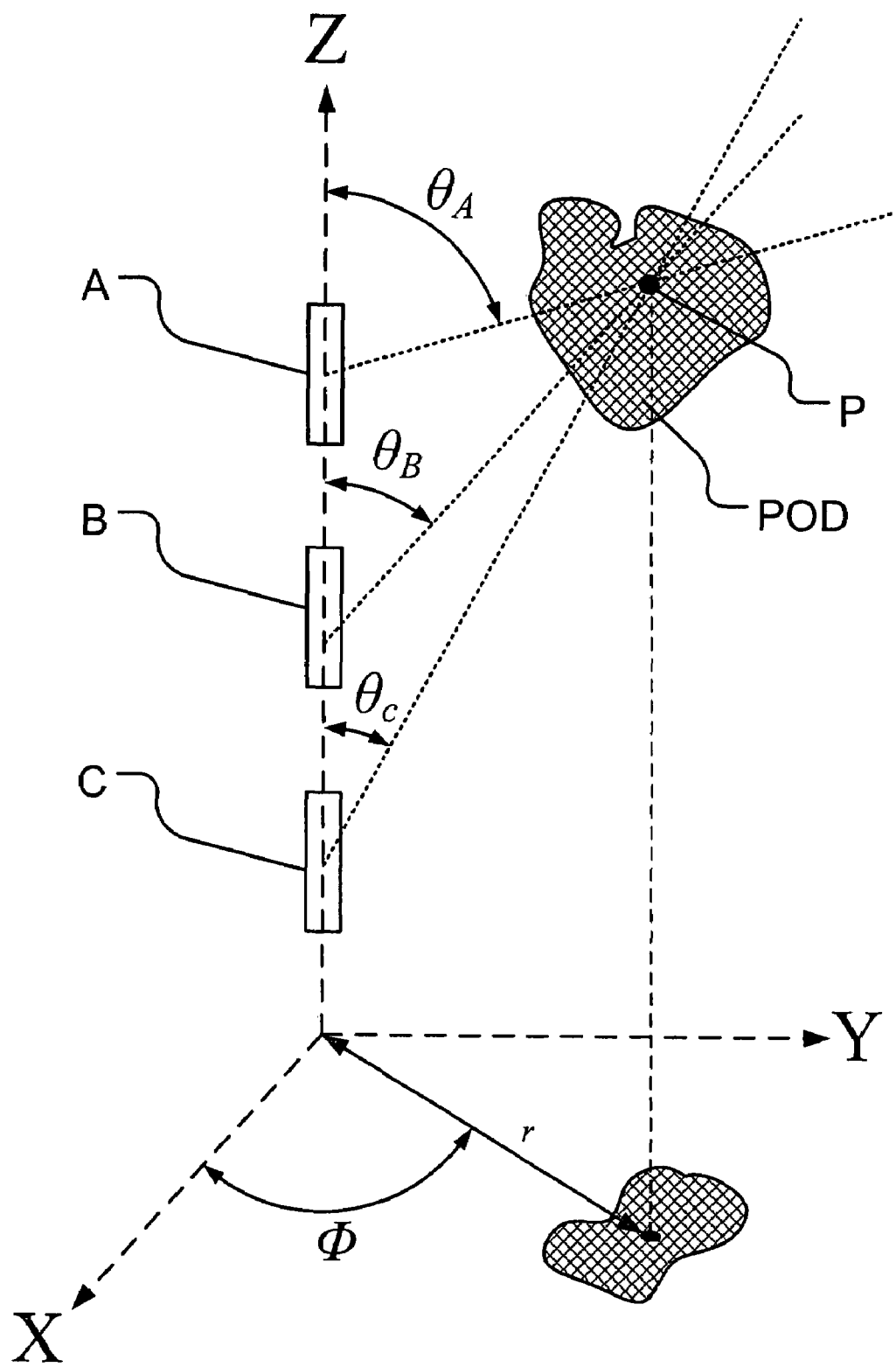
FIG. 2 illustrates the location of a higher density pod in a spherical coordinate system centered on detector B as detected by a substantially vertical three detector arrangement in which CRM flux arriving at detector B and passing through a region P in the POD will be detected at a small range of angles centered at $\theta_B$ and $\Phi$ while the CRM flux passing through region P and arriving at detectors A and C will be detected at different small ranges of angles $\theta_A$ and $\theta_C$ respectively and at essentially the same angle $\Phi$.

FIGS. 1 and 2 generally illustrate the concept in which one or more substantially vertical holes 100 are drilled into the earth and at least one CRM detector, and preferably a series of CRM detectors, are inserted in the hole(s) for detecting CRM flux along a range of trajectories 102 and 102'. For example, a time projection chamber (TPC) may be a suitable CRM detector, although the present disclosure is not limited thereto. Once the location and/or orientation of the detectors is determined or established, the direction of travel (angles $\theta$ and $\phi$ in spherical coordinates), and optionally the approximate energy, of each detected muon may be collected and analyzed to construct an image of the material through which the muons have passed before reaching the detector(s).

In an example embodiment, the CRM detectors may be surrounded, encompassed or otherwise shielded with some relatively high density material to reduce the detectors' sensitivity to "soft" or low energy particles, such as electrons resulting from muon bremsstrahlung. The data acquired by the tracking detectors consists of the 3-dimensional position of entry of the track in the detector and the two angles of incidence, $\theta$ and $\phi$, necessary to determine the detected particles' trajectories. The rate of energy loss in the detector material may also be measured for particle identification. In addition, the presence of an induced magnetic field near the detectors could be used to obtain a measure of the CRM momentum.

After a suitable observation period, the data set for each detector position, characterized by n(z, $\theta$, $\phi$), the intensity (or number of events) observed at a depth z and angles $\theta$ and $\phi$ may be analyzed to indicate the relative (or locally differentiated) and absolute flux distribution of CRM along the trajectories through the earth which intersected the detector or detectors.

After correction for known topological and geographical features of the study region are made, those regions having a significantly higher (or lower) density compared to nearby regions, e.g., the "POD" illustrated in FIGS. 1 and 2, will result in a deficit (or surplus, respectively) of counts being detected at the same angle $\theta$ (e.g., azimuth angle) for each detector position and will exhibit variations across the different angles $\theta$ (e.g., incident angle) corresponding to the various detectors. The detected variations will depend on the relative positioning of the detectors and the POD depending on the depth compared to those trajectories which to not intersect the POD and reflect a baseline CRM flux from which the CRM flux though the POD deviates.

FIG. 1 illustrates an example embodiment of a detector system according to the present disclosure in which cosmic ray muons (CRM) impinging on the surface of the earth penetrate to various depths depending on their energy and the amount of material encountered along their paths. The surviving CRM are may then be detected by one of a substantially vertically arranged group of detectors A, B, and C provided in a borehole 100. The variations in both the distance traveled and the material through which the CRMs have traveled to reach the detector result in corresponding variations in the CRM flux observed by detectors A, B, and C corresponding to different trajectories 102 and 102'.

FIG. 2 illustrates the location of a high density pod in a spherical coordinate system centered on detector B using a substantially vertical detector arrangement in which CRM flux arriving at detector B and passing through a region P in the POD will be detected at a small range of angles centered at $\theta_B$ and $\Phi$ while the CRM flux passing through region P and arriving at detectors A and C will be detected at a small range of angles $\theta_A$ and $\theta_C$ respectively. By comparing the CRM flux detected along various trajectories, an image or plot of the relative densities in the regions traversed by the detected CRMs may be produced.

For example, as illustrated in FIG. 2, by comparing the data collected by the various detectors and correlating the relative increases and decreases in the CRM flux an angular width, $\Delta\theta$, and relative degree of the variation in the CRM flux may be used to determine the density and size of the POD and its distance (r) from a vertical (z) axis defined by the array of detectors. This data may also be used to generate a 2-D projection of the position of POD onto an X-Y plane as shown. Although, as illustrated in FIG. 2, a plurality of detectors is utilized, as will be appreciated, corresponding data could also be collected by repositioning one or a small number of detectors and combining the CRM flux data collected from the sequence of positions.

Figure 3:
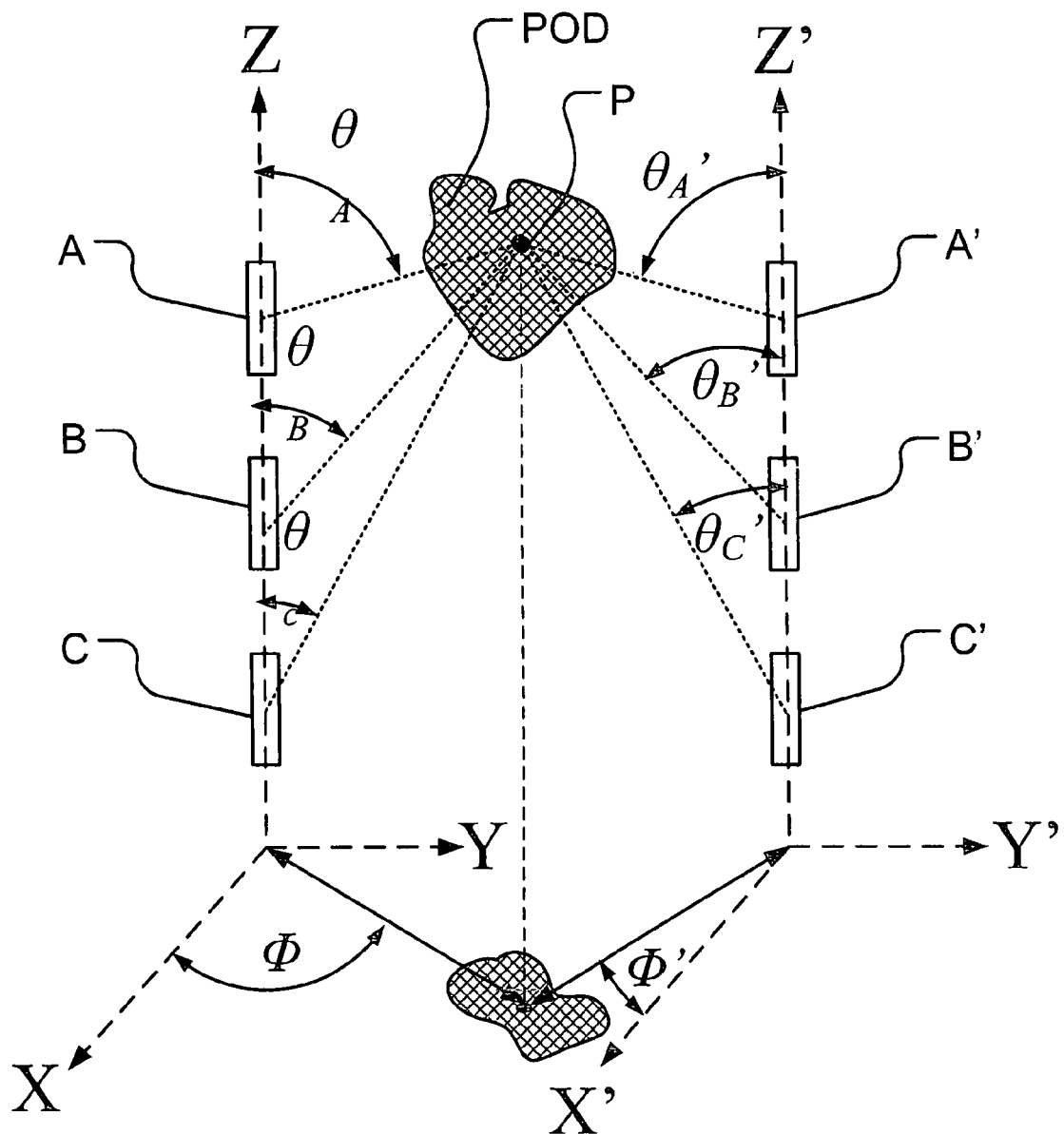
FIG. 3 illustrates the location of a higher density pod in a spherical coordinate using multiple vertical detector arrangements in which CRM flux arriving at a first group of detectors A, B, and C and passing through a region P in the POD will be detected at a small range of angles centered at $\theta_A$, $\theta_B$ and $\theta_C$ and $\Phi$ while the CRM flux passing through region P and arriving at a second group of detectors A', B', and C' will be detected at a small range of angles centered at $\theta_A'$, $\theta_B'$, and $\theta_C'$ and $\Phi'$.

Similarly, as illustrated in FIG. 3, a plurality of detectors may be arrayed in a plurality of boreholes, either simultaneously or sequentially, for collecting CRM data from a greater number of trajectories. As suggested by FIG. 3, a secondary group of detectors A', B', and C' would detect CRMs passing through point P of the POD at angles $\theta_A'$, $\theta_B'$ and $\theta_C'$, respectively and would reflect a different angle $\Phi'$ and could locate the point P in a secondary X'-Y' coordinate space oriented about axis Z'. The data from the secondary detectors could then be combined and/or correlated with the data from the primary detectors to improve the accuracy with which the location, dimensions and/or content of the POD are determined.

An example of the use of this technique may be explained by considering a localized high density deposit, POD, at some depth L beneath the earth's surface (assuming, for convenience, a flat surface topography and relatively uniform bulk geological strata), as illustrated in FIG. 1. CRM having trajectories that will cause them to pass through the POD before reaching one of the detectors will, on average, have traversed more material to reach the detectors, thereby increasing the likelihood that such CRM will not reach the detector. Accordingly, the CRM flux for such trajectories will be reduced or suppressed relative to those trajectories that permit the associated CRM to avoid traversing the higher density POD before reaching a detector.

As will be appreciated, conversely a POD having a reduced relative density or comprising a void, such as a cavern, will tend to produce a corresponding increase in the CRM flux along those trajectories that transverse the lower density POD when compared with trajectories that allow the associated CRM to avoid passing through the POD. By measuring the CRM distribution including the incidence angle and, optionally, the energy, at two or more depths, variations in the CRM flux may be correlated to construct an image of the variable density region.

With sufficient exposure, a complete density distribution of the region of the earth near the detectors would be obtained using techniques analogous to those employed in CT tomography as described in, for example, Klingenbeck-Regn. Multiple holes with multiple detectors and/or reconfigurable or repositionable detectors will increase detector coverage and/or data collection and may, therefore, be used to enhance the statistical precision with which density images may be obtained or the precision with which localized variations in density may be defined.

An example embodiment of a system useful for geologic tomography utilizing the example method described above may include one or more holes drilled approximately several hundred meters to about 1 km or more into the earth, the hole having a diameter of about 10 cm. For a plurality of holes, the holes may be separated by an appropriate distance (e.g., 50-100 m). However, the distance between the holes may vary based on the depth of the holes and the desired angle of detection (e.g., about 40 degrees or less). A series of time projection chambers (TPCs), each having a diameter of about 7-8 cm and a length of about 1 m may be positioned in the drill hole at various known depths. The TPCs may be surrounded by a suitable scintillator, which may act as a time trigger for muon detection. For example, the TPCs may be surrounded by plastic scintillation counters having a thickness of about 1 cm. The TPC may also be provided with water-tight casings. Furthermore, it may be beneficial to provide support to the holes to keep the holes open so as to facilitate removal of the TPCs. The general concept of a TPC is described by, for example, C. Hargrove et al., NIM 219 (1984) 461, the disclosure of which is hereby incorporated, in its entirety, by reference.

A TPC may include a drift chamber that is filled with a suitable gas (or liquid). The drift chamber may be elongated and/or cylindrical in shape, although other physical dimensions (e.g., planar, cubical, rectangular, polygonal) are possible. One or more ends of the drift chamber may be provided with a 2-dimensional measuring system. The 2-dimensional measuring system may use electron avalanche gain for the amplification and, thus, enhanced detection of ionization electrons. The 2-dimensional measuring system may also employ other techniques for achieving gain (e.g., gas scintillation proportional counters). Examples of 2-dimensional measuring systems include, but are not limited to, wire systems (e.g., multiwire proportional chambers (MWPC)), gas electron multipliers (GEM), and micromesh gaseous structures (MicroMegas). A relatively high voltage plane, electrode, or membrane may be provided in the drift chamber to produce an electric field. During operation of the present system and method, a muon traversing the drift chamber of a TPC may leave a track of ionization electrons. Consequently, the ionization electrons may drift toward the end of the drift chamber toward the 2-dimensional measuring system under the influence of the electric field.

Figure 5:
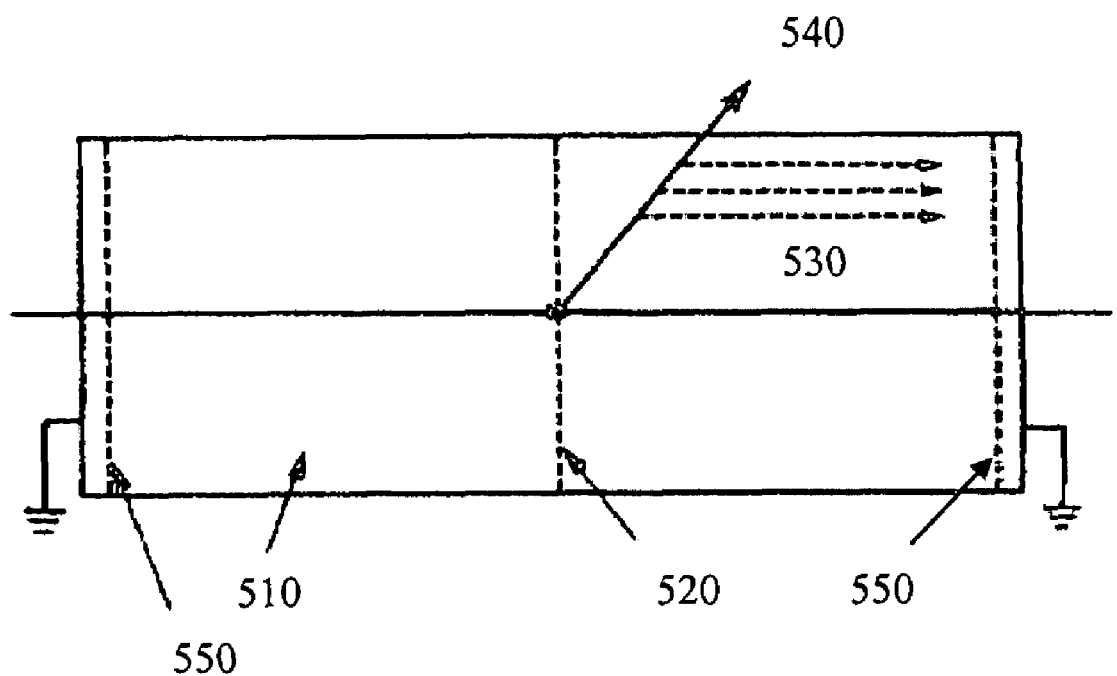
FIG. 5 is a cross-sectional view of a representative detector in a detector arrangement according to example embodiments.

Referring to FIG. 5, a TPC 500 may include of a relatively large volume drift region 510 with a relatively high voltage plane 520. A centrally-situated high voltage plane 520 (as illustrated) may provide two TPCs which use the same high voltage plane 520 to generate drifts in opposite directions. Alternatively, a single TPC may be provided with a drift in only one direction. A muon traversing the drift region 510 may generate a charged track 540. Consequently, ionization electrons 530 from the charged track 540 may drift to one or both ends of the drift region 510 where they are detected by a two-dimensional measuring system (e.g., proportional wire system) at the end cap 550, which measures the x and y coordinates. The z coordinate (along the drift direction) is measured using the arrival time of the ionization electrons 530 relative to the trigger time provided by, for instance, plastic scintillators.

The gas mixture in the drift region 510 may be about 10-20% methane and about 80-90% argon or any comparable gas mixture which has adequate ionization, high drift velocity, and an acceptable level of diffusion. The gas mixture in the drift region 510 of the TPC 500 may be pressurized. A typical drift field in the chamber may be 250 V/cm so as to provide a drift velocity of about 70 mm/μs. The principle of operation of the TPC detector 500 is as follows. A charged particle (e.g., muon) traversing the drift region 510 may leave a track 540 of ionization. The ionization electrons 530 from this track 540 drift towards an end cap 550 under the influence of the electric drift field generated by the high voltage plane 520.

Figure 6:
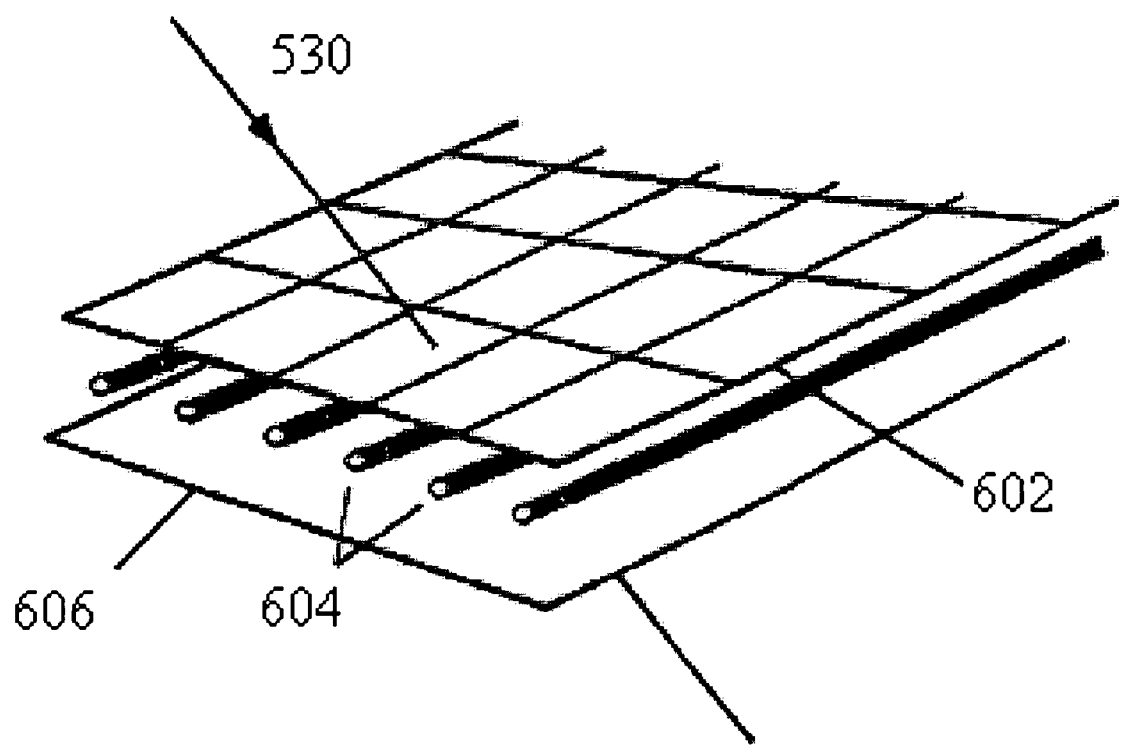
FIG. 6 is a perspective view of a 2-dimensional measuring system according to example embodiments provided at the endcap of the detector of FIG. 5.

Referring to FIG. 6, when the drifting ionization electrons 530 reach the end cap 550, the ionization electrons 530 may pass through a electronic shield 602, such as a grid or slot, into the proportional gain region. The ionization electrons 530 may be amplified by a gas avalanche so as to create a charge that is large enough for detection. Consequently, a charge may be produced on an anode (e.g., anode wire) 604 of the proportional gain region which may, in turn, induce a corresponding charge on a cathode 606 of the proportional gain region. The cathode 606 may be segmented in the direction of the anode 604, and the distribution of charge on the segments (pads) is measured and used to deduce the position of the track segment along the anode 604. Accordingly, the x and y coordinates may be measured. However, other techniques as mentioned above may also be used to measure the x and y coordinates. The drift time of the track segment to the wire is used, together with the known drift velocity in the gas, to give the z coordinate. From this information, the track is reconstructed. The amplitudes of the amplified signals are used to determine the energy loss (dE/dx) of the particle that produced the track.

In addition to the above-described wire systems (e.g., multiwire proportional chambers (MWPC)), other suitable 2-dimensional measuring systems include gas electron multipliers (GEM) and micromesh gaseous structures (MicroMegas), which may provide improved electron amplification. A GEM may be a plastic foil that is metal-coated on both sides and pierced with an array of relatively small holes. For example, a GEM may have a relatively high density of holes having a diameter of about 50-100 µm. The holes may also be biconical so as to flare outwards from the center of the foil. A voltage may be applied across the GEM so as to produce relatively strong electric fields in the holes. Consequently, ionization electrons drifting into the holes may create an avalanche of electrons, which may be detected by a suitable device to provide x and y coordinates. A plurality of GEMs may be cascaded by placing the foils on top of each other, thus multiplying the gains.

A micromesh gaseous structure (MicroMegas) may employ a relatively thin metal mesh instead of anode wires. A wire grid may be provided above the MicroMegas to produce a potential difference with the mesh. Consequently, drifting ionization electrons may form electron avalanches near the relatively strong electric fields around the mesh. The avalanche of electrons may be detected by a suitable device to provide x and y coordinates. A plurality of MicroMegas may be cascaded by placing the meshes on top of each other, thus multiplying the gains.

As will be appreciated, in addition to the TPCs described above, a wide range of detectors may be successfully employed in a system arranged for practicing the methods according to the present disclosure. However, practical limitations imposed by the access to the desired detector position(s) will tend to reduce the number or type of detectors that may be considered more suitable for a particular application. For example, although larger "sheet" detectors have been used for surface measurements, such detectors may not be suitable for positioning within a standard borehole. With respect to detectors intended for positioning within boreholes, however, shielding, additional instrumentation, for example, accelerometers and/or magnetometers, and/or positioning or aiming mechanisms may be incorporated for improving the quality of the collected data. To the extent that the orientation and/or configuration of the detectors within one or more detector arrays may be modified with the detectors in position, the modifications may be synchronized to allow "focusing" of the array to improve the data collection with respect to regions of particular interest.

Once positioned and activated, each TPC, triggered by the scintillation counters (for example, in time coincidence on opposite sides of the TPC) samples the trajectory of traversing CRM using the ionization trail produced in the gas of the detector. As noted above, each detector or group of detectors may be provided or associated with one or more precision accelerometers, or other suitable inertial measurement unit ("IMU") or device, capable of determining the position and orientation of the detector or detector array within a known margin of error.

As will be appreciated, the precision with which the depth and orientation of the detectors may be determined will improve the accuracy of the density images or maps generated from the detector data. For example, drill holes or bore holes are rarely, if ever, completely vertical. The data from the accelerometers and/or other IMUs may be used in combination with GPS devices and/or conventional cartographic tools for improving the accuracy of the positioning information for each of the detectors and thereby compensate for drill hole deviations or "wandering" and/or deliberately non-vertical holes formed by "slant" drilling. Through the use of such techniques the positioning of the detector may determined with a precision on the order of 10 mrad or better. Conventional accelerometers and other IMUs are readily available from a number of commercial vendors and are easily accessible by those skilled in the art. The company MEMSIC, for example, is a provider of accelerometers and sensors, particularly CMOS-based MEMS accelerometers/sensors, and provides those skilled in the art with various tools for identifying one or more devices that would be suitable for a particular application.

Figure 4A:
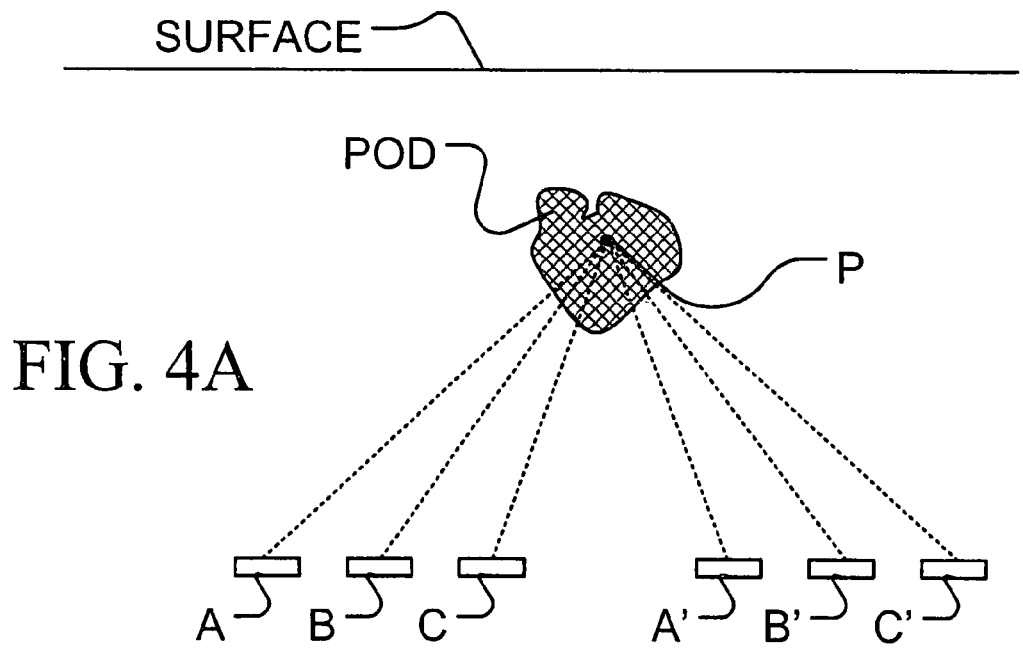
FIG. 4A illustrates the location of a higher density pod using multiple horizontal detector arrangements in which CRM flux arriving at a first group of detectors A, B, and C and passing through a region P in the POD will be detected at a first small range of angles while the CRM flux passing through region P and arriving at a second group of detectors A', B', and C' will be detected at another small range of angles.

An alternate example embodiment shown in FIG. 4A of a system useful for geologic tomography utilizing the example method described above may include one or more large area (e.g., 2 m×2 m) TPC detector systems with plastic scintillator trigger detectors placed horizontally in a mine or other underground cavity. Time projection chambers (TPC), as described by, for example, C. Hargrove et al., NIM 219 (1984) 461, the disclosure of which is hereby incorporated, in its entirety, by reference, having a length of about 1 m surrounded by 1 cm thick plastic scintillation counters are placed at various depths or at various horizontal locations. Each TPC, triggered by the scintillation counters (perhaps, in time coincidence on opposite sides of the TPC) samples the trajectory of the detected muon using the ionization trail produced in the gas of the detector by the muon as described above to determine the direction of the detected muon. As will be appreciated, data from horizontal detector arrays and vertical detector arrays may be combined to improve the accuracy of the scan as permitted by the site limitations and thereby improve the system flexibility and adaptability.

Figure 4B:
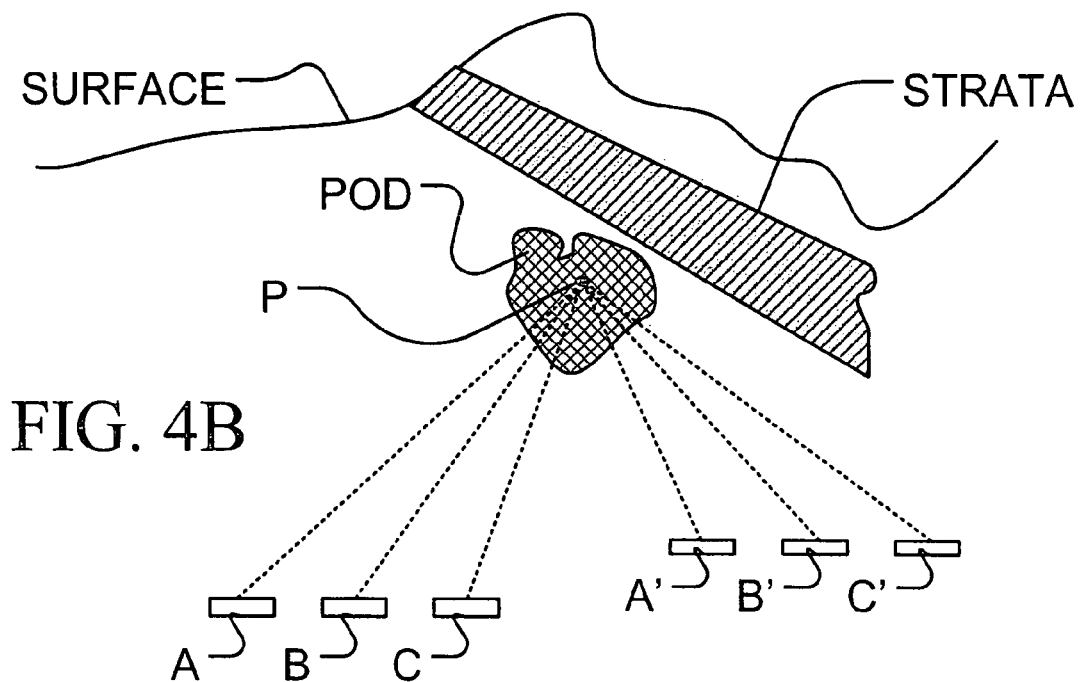
FIG. 4B illustrates some of the non-ideal conditions that should be taken into account to improve the precision with which the higher density pod may be located using multiple detector arrangements including variations in the placement of the detectors relative to the POD, variations in the surface of the region under analysis and/or known or suspected strata or other geological formations that would tend to affect the CRM flux arriving at the detectors.

Illustrated in FIG. 4B is an example embodiment in which additional variables are indicated including an irregular surface topography, non-uniform strata and offset detector arrays. Based on the data available, each of these variables may be taken into account during the analysis of the CRM flux data from the various detectors and detector arrays. For example, topographic profiles, accurate detector positioning and orientation data and strata data provided by core sampling and/or active seismic tomography in which generated shock waves are applied to a survey site region, reflected off the underlying rock strata at variable velocities and detected by an array of geophones arrayed across the surface of the survey site. As will be appreciated, some initial substrate composition data may be obtained during the drilling of the boreholes utilized for the vertical detector installations and/or may have been collected during the excavations by which openings or chambers in which larger, e.g., >1 m², detectors may be deployed, for example, a horizontal configuration, as suggested in FIGS. 4A and 4B, in a mine.

In the TPCs, ten or more 3-dimensional track coordinates may be recorded with precision of 300 µm (or better) for each coordinate. The angular resolution thus obtained for each muon track will typically be better than 10 mrad. Thus, for a structure located 100 m from the detector, the position sensitivity for density variations would be of order 1 m. As will be appreciated by those skilled in the art, the actual precision with which the system may define or demarcate the boundaries of localized density variations will depend on various factors including, for example, the exposure time and uniformity of the bulk material in the region being examined, the accuracy with which the location and orientation of the detectors may be determined and the presence or effectiveness of detector shielding to suppress detection of "soft" particles.

The CRM energy and angle distributions of CRM at the surface of the earth and at depths up to many kilometers are relatively well known and have previously been measured, as described by Nagamine and Tanaka, as well as in R. K. Adair and H. Kasha, *Muon Physics*, eds. V. W. Hughes and C. S. Wu, vol. 1 (Academic Press, 1976) p. 323, and by the Particle Data Group, *Phys. Lett.* B 592 (2004) 1, the disclosures of which are hereby incorporated in their entirety by reference. Drilling holes of the required diameter and depth is well within the conventional drilling practices and techniques currently employed in geological exploration.

TPCs triggered by scintillators are tracking devices and are known to have the properties described above. The TPCs triggered by scintillation counters, however, represent just one example of a suitable compact position sensitive tracking detector system commonly employed in particle and nuclear physics experiments. Those of ordinary skill in the art will appreciate, therefore, that the TPCs described above may be replaced by or used in conjunction with other types of radiation detectors of suitable size and sensitivity that could be used in the present application.

The present disclosure, therefore, encompasses both the configuration of equipment and the method of utilizing such equipment to examine or evaluate the tomographic configuration of the earth for geological exploration using cosmic ray muons impinging at all possible angles on deeply positioned detectors. In this technique, CRM of all angles impinging on the detectors would be used to survey the nearby region of the earth using differential intensity variations n(z, θ, φ) and, depending on the number and location of the detectors, may be used to develop a subterranean density map. This apparatus and technique may be useful, for example, in identifying and imaging mineral and/or petroleum rich regions within a larger region. Similarly, this apparatus and technique may be useful for identifying and imaging subterranean voids such as natural caverns or abandoned mines.

What is claimed is:

1. A method for mapping subterranean densities, comprising:
   positioning a plurality of muon detectors in one or more subterranean locations, at least one of the plurality of muon detectors having a drift region;
   providing a voltage plane in the drift region;
   generating an electric field with the voltage plane, the electric field being parallel to a longitudinal axis of the drift region; and
   measuring a plurality of muon trajectories.

2. The method of claim 1, wherein the plurality of muon detectors are arranged in substantially vertically-oriented groupings.

3. The method of claim 1, wherein the plurality of muon detectors are arranged in substantially horizontally-oriented groupings.

4. The method of claim 1, wherein the voltage plane is centrally located in the drift region.

5. The method of claim 1, wherein the voltage plane is perpendicular to the longitudinal axis of the drift region.

6. The method of claim 1, wherein an incident angle of each of the plurality of muon trajectories is measured.

7. The method of claim 1, wherein an azimuth angle of each of the plurality of muon trajectories is measured.

8. The method of claim 1, wherein an intensity of each of the plurality of muon trajectories is measured.

9. The method of claim 1, further comprising:
   drifting ionization electrons away from the voltage plane and in a direction parallel to the longitudinal axis of the drift region, the ionization electrons generated by one or more muons traversing the drift region.

10. The method of claim 1, further comprising:
   measuring ionization electrons with a 2-dimensional measuring system, the ionization electrons generated by one or more muons traversing the drift region.

11. The method of claim 1, further comprising:
   generating an electron avalanche to amplify ionization electrons so as to facilitate measuring the plurality of muon trajectories, the ionization electrons generated by one or more muons traversing the drift region.

12. The method of claim 1, further comprising:
   processing the plurality of measured muon trajectories to form a subterranean density map.

13. The method of claim 12, wherein the plurality of measured muon trajectories is processed in conjunction with topographical or geological data to correct for surface or strata irregularities.

14. A system for mapping subterranean densities, comprising:
   a plurality of muon detectors in one or more subterranean locations;
   a drift region in at least one of the plurality of muon detectors;
   a voltage plane in the drift region; and
   a 2-dimensional measuring device at an end of the drift region to measure a plurality of muon trajectories.

15. The system of claim 14, wherein at least one of the plurality of muon detectors is covered with a plastic scintillator.

16. The system of claim 14, wherein the drift region includes a gas mixture including argon and methane.

17. The system of claim 14, wherein the 2-dimensional measuring device includes a plurality of anode wires arranged in parallel.

18. The system of claim 14, wherein the 2-dimensional measuring device includes a plastic foil coated with a metal and having an array of holes.

19. The system of claim 14, wherein the 2-dimensional measuring device includes a metal mesh.

20. The system of claim 14, further comprising:
   a positioning device to determine the one or more subterranean locations;
   a communication device to receive and transmit the plurality of measured muon trajectories from the plurality of muon detectors; and
   a processor to manipulate the plurality of measured muon trajectories to produce a subterranean density map.

* * * * *